US008723479B2

(12) United States Patent
Kim et al.

(10) Patent No.: US 8,723,479 B2
(45) Date of Patent: May 13, 2014

(54) BATTERY PACK, CHARGER, AND CHARGING SYSTEM THAT PROTECTS RECHARGEABLE BATTERIES AGAINST A MALFUNCTIONING PROTECTION CIRCUIT

(75) Inventors: Beom-Gyu Kim, Yongin-si (KR);
Susumu Segawa, Yongin-si (KR);
Eui-Jeong Hwang, Yongin-si (KR);
Se-Sub Sim, Yongin-si (KR);
Jong-Woon Yang, Yongin-si (KR);
Han-Seok Yun, Yongin-si (KR);
Jin-Wan Kim, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 433 days.

(21) Appl. No.: 13/033,449

(22) Filed: Feb. 23, 2011

(65) Prior Publication Data
US 2012/0032639 A1 Feb. 9, 2012

(30) Foreign Application Priority Data
Aug. 6, 2010 (KR) ........................ 10-2010-0075990

(51) Int. Cl.
*H02J 7/00* (2006.01)
(52) U.S. Cl.
USPC ........................................................ 320/112
(58) Field of Classification Search
USPC ........................................................ 320/112
See application file for complete search history.

(56) References Cited

U.S. PATENT DOCUMENTS

| | | | | |
|---|---|---|---|---|
| 6,107,802 A | * | 8/2000 | Matthews et al. | 324/427 |
| 6,154,004 A | * | 11/2000 | Higuchi | 320/106 |
| 6,198,252 B1 | * | 3/2001 | Mukainakano | 320/128 |
| 6,208,117 B1 | * | 3/2001 | Hibi | 320/134 |
| 6,639,387 B2 | * | 10/2003 | Kitagawa et al. | 320/134 |
| 7,215,096 B2 | | 5/2007 | Miura et al. | |
| 7,553,583 B2 | | 6/2009 | Eaves | |
| 2003/0044689 A1 | * | 3/2003 | Miyazaki et al. | 429/320 |
| 2003/0141847 A1 | * | 7/2003 | Fujiwara | 320/134 |
| 2006/0119315 A1 | | 6/2006 | Sasaki et al. | |
| 2007/0285062 A1 | | 12/2007 | Cherng et al. | |
| 2009/0001935 A1 | * | 1/2009 | Odaohhara | 320/134 |
| 2009/0051315 A1 | | 2/2009 | Wang et al. | |
| 2009/0102428 A1 | * | 4/2009 | Aradachi et al. | 320/153 |
| 2009/0167252 A1 | | 7/2009 | Abe | |
| 2009/0202890 A1 | | 8/2009 | Takeda et al. | |

FOREIGN PATENT DOCUMENTS

| | | |
|---|---|---|
| JP | 2009124883 A | 6/2009 |
| JP | 2009159765 A | 7/2009 |
| JP | 2009177964 A | 8/2009 |
| KR | 1020060061909 A | 6/2006 |
| KR | 1020070089347 A | 8/2007 |

OTHER PUBLICATIONS

Korean Office Action issued by Korean Patent Office on Feb. 23, 2012 in connection with Korean Application Serial No. 10-2010-0075990 and Request for Entry attached herewith.

* cited by examiner

*Primary Examiner* — Arun Williams
(74) *Attorney, Agent, or Firm* — Robert E. Bushnell, Esq.

(57) ABSTRACT

A battery pack, a charger, and a charging system. The battery pack includes a rechargeable battery, and a protection circuit to control charging and discharging of the battery, wherein the protection circuit includes a micom to output an operating state signal representing an operating state of the micom and a malfunction transferring unit to transfer information on whether the battery is malfunctioning based on the operating state signal. Accordingly, when an error is detected by the protection circuit of the battery pack, charging is stopped, and thus the battery pack may be stably charged.

15 Claims, 5 Drawing Sheets

FIG. 9

BATTERY PACK, CHARGER, AND CHARGING SYSTEM THAT PROTECTS RECHARGEABLE BATTERIES AGAINST A MALFUNCTIONING PROTECTION CIRCUIT

CLAIM OF PRIORITY

This application makes reference to, incorporates the same herein, and claims all benefits accruing under 35 U.S.C. §119 from an application earlier filed in the Korean Intellectual Property Office on 6 Aug. 2010 and there duly assigned Serial No. 10-2010-0075990.

BACKGROUND OF THE INVENTION

1. Field of the Invention

One or more embodiments of the present invention relate to battery packs, chargers, and charge systems.

2. Description of the Related Art

As portable electronic devices such as portable phones, digital cameras, and laptop computers are widely used, batteries for supplying power to operate the portable electronic devices are vigorously researched. In addition, chargers for charging the batteries are also researched to charge the batteries efficiently and stably.

SUMMARY OF THE INVENTION

One or more embodiments of the present invention include battery parks, chargers, and charging systems in which charging may be stopped if an error is generated in a protection circuit of the battery packs.

Additional aspects be set forth in part in the description which follows and, in part, will be apparent from the description, or may be learned by practice of the presented embodiments.

According to one aspect of the present invention, there is provided a battery pack that includes a rechargeable battery and a protection circuit to control charging and discharging of the battery, wherein the protection circuit includes a micom to output an operating state signal representing an operating state of the micom and a malfunction transferring unit to transfer information on whether the battery is malfunctioning based on the operating state signal.

The protection circuit may include an output terminal connected to the charger, and the malfunction transferring unit may allow a current to flow through the output terminal when the micom is in a normal state, and may block a current from flowing to the output terminal when the micom is in an abnormal state. The malfunction transferring unit may include a resistor and a capacitor serially connected between a first terminal and a second terminal of the protection circuit a switching device connected in parallel to the capacitor and a switching control unit to control an operation of the switching device. The switching control unit to cause the switching device to pass a current upon receiving a pulsed operating state signal from the micom upon the micom being in a normal state. The switching control unit to cause the switching device to pass a current upon receiving a high level operating state signal from the micom upon the micom being in a normal state. The first terminal may be an output terminal to transfer information to the charger, and the second terminal may be a negative electrode terminal to charge the battery pack. The resistor may be a thermistor. The thermistor may include a negative temperature coefficient (NTC) material.

According to another aspect of the present invention, there is provided a charger for charging a battery pack, including an input terminal to receive information from the battery pack and a charging determining unit to determine whether or not to charge the battery pack based on an amount of a current flowing through the input terminal. The charging determining unit to stop charging the battery pack when a current does not flow through the input terminal. The charger may also include a temperature measuring unit to measure a temperature of the battery pack according to the amount of the current. The charging determining unit to determine whether or not to charge the battery pack based on the measured temperature.

According to another aspect of the present invention, there is provided a charging system that includes a battery pack including a rechargeable battery and a protection circuit to control charging and discharging of the battery, the protection circuit to generate an operating state signal representing an operating state of the protection circuit and a charger to determine whether or not to charge the battery pack based on the operating state signal. When the protection circuit is in a normal state, the protection circuit may flow a current through a communication terminal to transfer information between the battery pack and the charger, and when the protection circuit is in an abnormal state, the protection circuit may block a flow of current through the communication terminal. When the current flow through the communication terminal is blocked, the charger may stop charging the battery pack. When a current flows through the communication terminal, the charger may charge the battery pack based on an amount of said current.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description.

The embodiments of the present invention will be described below in more detail with reference to the accompanying drawings. Those components that are the same or are in correspondence are rendered the same reference numeral regardless of the figure number, and redundant explanations are omitted.

In the description of the present invention, certain detailed explanations of related art are omitted when it is deemed that they may unnecessarily obscure the essence of the invention. The meaning of the terms used in the present specification and claims of the present invention should not be limited to be of ordinary or literary meaning but construed as meanings and concepts not departing from the spirit and scope of the invention based on the principle that the inventor is capable of defining concepts of terms in order to describe his or her invention in the most appropriate way.

Figure 1:
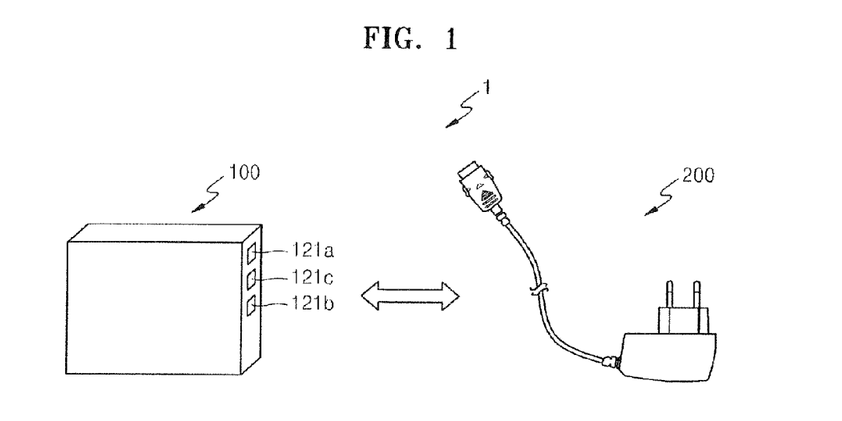
FIG. 1 is a conceptual diagram illustrating a charging system according to an embodiment of the present invention.

Turning now to FIG. 1, FIG. 1 is a conceptual diagram illustrating a charging system 1 according to an embodiment of the present invention. Referring to FIG. 1, the charging system 1 includes a battery pack 100 including rechargeable batteries and a charger 200 for charging the batteries. Terminals 121a through 121c of the battery pack 100 and the charger 200 may be directly connected to each other to charge the batteries. However, alternatively, the battery pack 100 may be connected to the charger 200 via a case (not shown) for connecting the battery pack 100 to the charger 200. Alternatively, when connection terminals of the charger 200 cannot be connected to the battery pack 100 or to a case, a connection jack for connecting them may be used.

Figure 2:
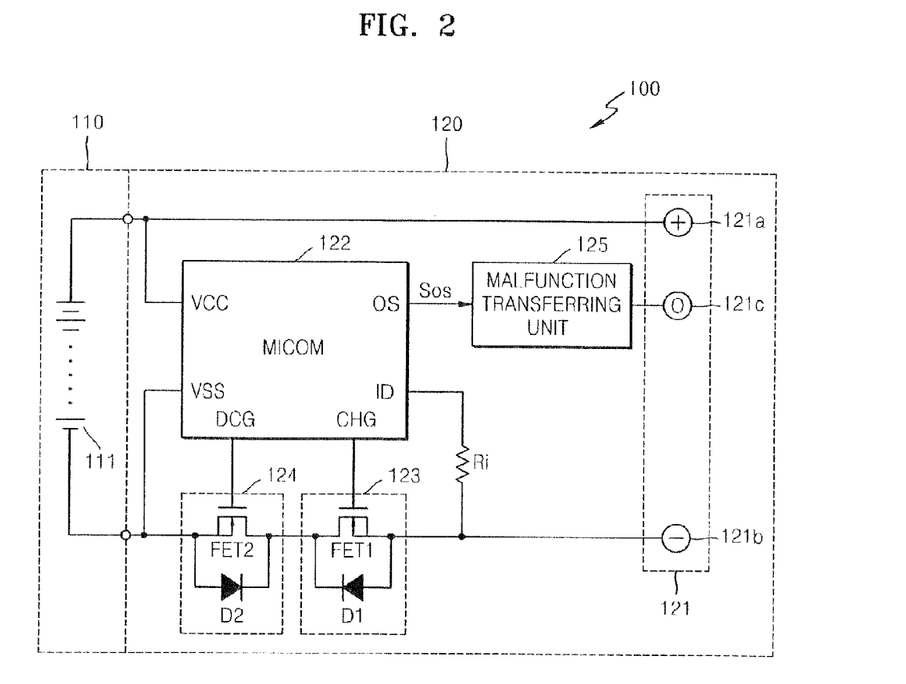
FIG. 2 illustrates a battery pack according to an embodiment of the present invention.

Turning now to FIG. 2, FIG. 2 illustrates the battery pack 100 of the charging system 1 of FIG. 1 according to an embodiment of the present invention. Referring now to FIG. 2, the battery pack 100 includes a battery 110 and a protection circuit 120.

The battery 110 is a rechargeable secondary battery and may include at least one bare cell 111. The battery 110 is connected to the protection circuit 120, and when the charger 200 or an external device is connected to a terminal unit 121 of the protection circuit 120, charging or discharging is conducted. Here, the external device denotes a load of, for example, a mobile phone or a laptop computer that consumes electrical energy stored in the battery 110.

The protection circuit 120 controls charging and discharging of the battery 110. The protection circuit 120 includes the terminal unit 121, a microcontroller (or micom for short) 122, charging control switch 123, a discharging control switch 124, and a malfunction transferring unit 125.

The terminal unit 121 is connected to either an external device which discharges the battery 110 or a charger 200 which charges the battery 110. The terminal unit 121 may include at least three terminals that are connected to the charger 200 or the external device. The terminal unit 121 may include a positive electrode terminal 121a, a negative electrode terminal 121b, and an output terminal 121c.

When the charger 200 is connected to the terminal unit 121, a current flows into the battery pack 100 through the positive electrode terminal 121a and a current flows out of the battery pack 100 through the negative electrode terminal 121b, thereby charging the battery 110. In contrast, when an external device is connected to the terminal unit 121, a current flows out of the battery pack 100 through the positive electrode terminal 121a and a current flows into the battery pack 100 through the negative electrode terminal 121b, thereby discharging the battery 110.

The output terminal 121c is connected to a terminal of the charger 200 and transfers information of the battery pack 100 to the charger 200. The output terminal 121c may be a terminal that informs the charger 200 of the temperature of the battery pack 100. The charger 200 may determine the temperature of the battery pack 100 according to an amount of a current flowing through the output terminal 121c. However, the information transferred to the charger 200 by using the output terminal 121c is not limited to information regarding temperature, as output terminal 121c may also transfer information on various parameters.

The micom 122 controls cell balancing, charging, and discharging of the battery 110. The micom 122 may include, for example, a power terminal VCC, a ground terminal VSS, a charging control terminal CHG, a discharging control terminal DCG, a current sensing terminal ID, and an operating state signal output terminal OS.

A power voltage and a ground voltage are applied to the power terminal VCC and the ground terminal VSS, respectively. A resistor Ri is connected to the current sensing terminal ID, and measures a current flowing through the battery pack 100. When there is an error in the battery pack 100, the charging control terminal CHG and/or the discharging control terminal DCG output a charging control signal for controlling the operation of the charging control switch 123 and/or a discharging control signal for controlling the discharging control switch 124.

An operating state signal Sos representing a state of the micom 122 is output through the operating state signal output terminal OS. The output operating state signal Sos is applied to the malfunction transferring unit 125. When micom 122 is in a normal state, the micom 122 outputs a high level signal as the operating state signal Sos, and when micom 122 is in an abnormal state, the micom 122 outputs a low level signal or signal output may be stopped. Alternatively, the micom 122 may instead output a pulse signal as the operating state signal Sos when micom 122 is in a normal state, and when micom 122 is in an abnormal state, the micom 122 may output an arbitrary signal that is not a pulse signal or signal output may be stopped.

The micom 122 senses a charging or discharging state of the battery 110 or a current flowing state in the battery pack 110 via the above terminals. Although not shown in FIG. 2, the micom 122 may further include a terminal for measuring a medium voltage between the plurality of bare cells 111 included in the battery 110. Also, the micom 122 controls cell balancing, charging, and discharging of the battery 110 according to a sensing result.

According to the current embodiment, one micom 122 is illustrated to control all elements of the protection circuit 120, but the present invention is not limited thereto. For example, an analog front end (not shown) that measures a voltage of the battery 110 and controls operations of the charging control switch 123 and the discharging control switch 124 may be further included, and the micom 122 may control the analog front end.

The charging control switch 123 and the discharging control switch 124 each include a field effect transistor (FET) and a parasitic diode. That is, the charging control switch 123 includes FET1 and parasitic diode D1, and the discharging control switch 124 includes FET2 and parasitic diode D2. A connection direction of FET1 of charging control switch 123 between a source and a drain is opposite to that of FET2 of discharging control switch 124. Accordingly, the FET1 of the charging control switch 123 is connected so as to control flow of a current from the positive electrode terminal 121a to the battery 110 or from the battery 110 to the negative electrode terminal 121b. On the other hand, the FET2 of the discharging control switch 124 is connected so as to control flow of a current from the battery 110 to the positive electrode terminal 121a or from the negative electrode terminal 121b to the battery 110. Here, the FET1 and the FET2 of the charging control switch 123 and the discharging control switch 124 are switching devices, but the embodiments of the present invention are not limited thereto and electric devices performing other types of switching functions may be used. In addition, the parasitic diodes D1 and D2 included in the charging control switch 123 and the discharging control switch 124 are configured to allow a current to flow in the opposite direction to a restricted direction of the current.

The malfunction transferring unit 125 transfers to the charger 200 information on whether the micom 122 is malfunctioning. The malfunction transferring unit 125 varies a current output to the output terminal 121c according to the operating state signal Sos, so that the charger 200 may determine whether the micom 122 is malfunctioning. For example, the malfunction transferring unit 125 allows a current to flow to the output terminal 121c when the micom 122 is in a normal state and blocks a current to the output terminal 121c when the micom 122 is in an abnormal state.

Figure 3:
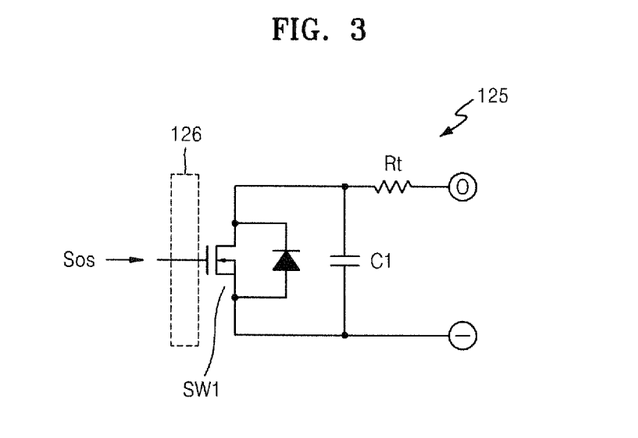
FIG. 3 is a circuit diagram illustrating a malfunction transferring unit according to a first embodiment of the present invention.

Turning now to FIG. 3. FIG. 3 is a circuit diagram illustrating the malfunction transferring unit 125 according to a first embodiment of the present invention. Referring to FIG. 3, the malfunction transferring unit 125 may include a sensing resistor Rt, a first capacitor C1, a first switching device SW1, and a switching control unit 126.

The sensing resistor Rt and the first capacitor C1 are serially connected between the output terminal 121c and the negative electrode terminal 121b. The first switching device SW1 is connected in parallel to the first capacitor C1. When the first switching device SW1 is an FET, a source electrode of the first switching device SW1 is connected to the negative electrode terminal 121b, and a drain electrode thereof is connected to a nude to which the first capacitor C1 and the sensing resistor Rt are connected. The operating state signal Sos is applied to a gate electrode of the first switching device SW1. According to the current embodiment, the first switching device SW1 may be an n-channel FET.

The switching control unit 126 controls a switching operation of the first switching device SW1. According to the current embodiment, the switching control unit 126 may be a line that directly connects the operating state signal output terminal OS and the gate electrode of the first switching device SW1.

When a high level signal is applied to the gate electrode of the first switching device SW1 as the operating state signal Sos, the first switching device SW1 is in an on state, and a current flows between the source electrode and the drain electrode of the first switching device SW1. Accordingly, a current also flows through the sensing resistor Rt. The charger 200, which is connected to the output terminal 121c and the negative electrode terminal 121b, may determine that the micom 122 is in a normal state when the charger 200 senses that a current is flowing through the output terminal 121c.

On the other hand, when a low level signal is applied to the gate electrode of the first switching device SW1 as the operating state signal Sos, the first switching device SW1 is in an off state, and blocks a current from flowing between the source electrode and the drain electrode of the first switching device SW1. Accordingly, a current also does not flow through the sensing resistor Rt. The charger 200, which is connected to the output terminal 121c and the negative electrode terminal 121b, may determine that the micom 122 is in an abnormal state when the charger 200 senses that a current does not flow through the output terminal 121c.

Figure 4:
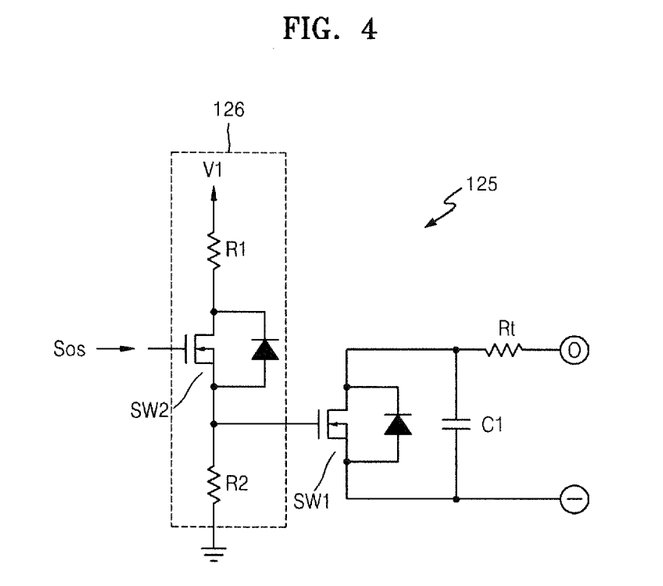
FIG. 4 is a circuit diagram illustrating a malfunction transferring unit according to a second embodiment of the present invention.

Turning now to FIG. 4, FIG. 4 is a circuit diagram illustrating the malfunction transferring unit 125 according to a second embodiment of the present invention. Referring to FIG. 4, the malfunction transferring unit 125 may include a sensing resistor Rt, a first capacitor C1, a first switching device SW1, and a switching control unit 126. The sensing resistor Rt, the first capacitor C1, and the first switching device SW1 are the same as those of FIG. 3, respectively, and thus descriptions thereof will not be repeated.

The switching control unit 126 controls a switching operation of the first switching device SW1. The switching control unit 126 according to the current embodiment may include a first resistor R1, a second resistor R2, and a second switching device SW2.

A source electrode of the second switching device SW2 is connected to a terminal of the second resistor R2, and a drain electrode thereof is connected to a terminal of the first resistor R1. A gate electrode of the second switching device SW2 is connected to the operating state signal output terminal OS and thus the operating state signal Sos may be applied to the gate electrode. According to the current embodiment, the second switching device SW2 may be an n-channel FET.

The first resistor R1 is connected between a power source for supplying a first voltage V1 and the drain electrode of the second switching device SW2, and the second resistor R2 is connected between ground and the source electrode of the second switching device SW2. A node to which the second resistor R2 and the source electrode of the second switching device SW2 are connected is connected to a gate electrode of the first switching device SW1.

When a high level signal is applied to the gate electrode of the second switching device SW2 as the operating state signal Sos, the second switching device SW2 is in an on state, and a high level signal is applied to the gate electrode of the first switching device SW1. When resistances of the first resistor R1 and the second resistor R2 are r1 and r2, respectively, a voltage applied to the gate electrode of the first switching device SW1 is V1*(r2/(r1+r2)), and thus the r1 and r2 are to be such that V1*(r2/(r1+r2)) turns on the first switching device SW1. For example, the resistances of the first resistor R1 and the second resistor R2 need to satisfy r2>>r1. When a high level signal is applied to the gate electrode of the first switching device SW1, a current flows between the source electrode and the drain electrode of the first switching device SW1, and the charger 200 may determine that the micom 122 is in a normal state when the charger 200 senses that a current is flowing through the output terminal 121c.

On the other hand, when a low level signal is applied to the gate electrode of the second switching device SW2 as the operating state signal Sos, the second switching device SW2 is in an off state, and a low level signal is applied to the gate electrode of the first switching device SW1. When a low level signal is applied to the gate electrode of the first switching device SW1, flow of a current between the source electrode and the drain electrode of the first switching device SW1 is blocked and the charger 200 may determine that micom 122 is in an abnormal state when the charger 200 senses that a current does not flow through the output terminal 121c.

Figure 5:
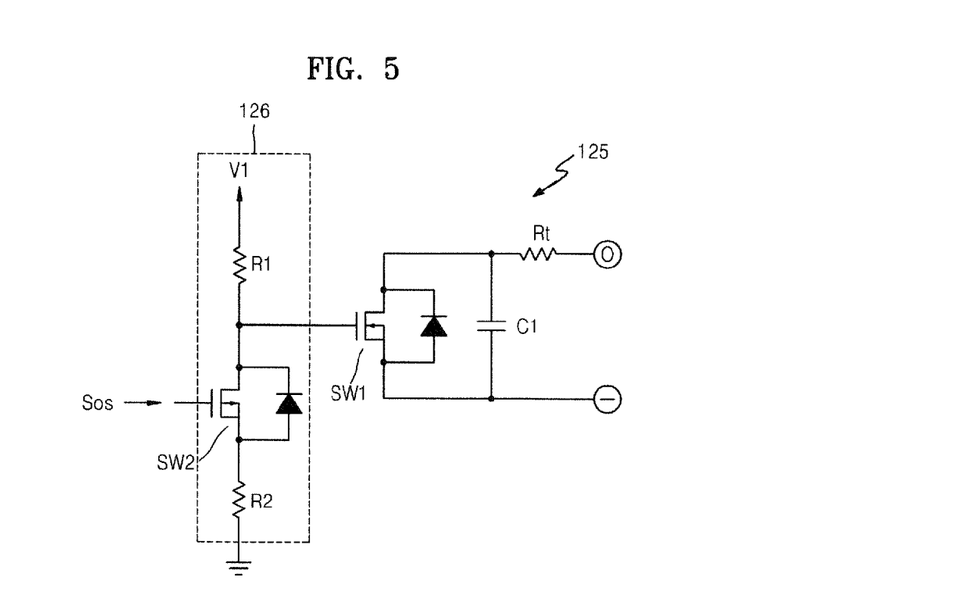
FIG. 5 is a circuit diagram illustrating a malfunction transferring unit according to a third embodiment of the present invention.

Turning now to FIG. 5, FIG. 5 is a circuit diagram illustrating the malfunction transferring unit 125 according to a third embodiment of the present invention. Referring to FIG. 5, the malfunction transferring unit 125 may include a sensing resistor Rt, a first capacitor C1, a first switching device SW1, and a switching control unit 126. The sensing resistor Rt, the first capacitor C1, and the first switching device SW1 are the same as those of FIG. 4, respectively, and this descriptions thereof will not be repeated.

The switching control unit 126 controls a switching operation of the first switching device SW1. The switching control unit 126 according to the third embodiment may include a first resistor R1, a second resistor R2, and a second switching device SW2. The configuration of the switching control unit 126 is the same as that of the switching control unit 126 of FIG. 4, and thus descriptions here will focus on differences from the embodiment of FIG. 4.

According to the current embodiment, a p-channel FET is used as the second switching device SW2, and a node to which the first resistor R1 and the drain electrode of the second switching device SW2 are connected is the gate electrode of the first switching device SW1.

When a high level signal is applied to the gate electrode of the second switching device SW2 as the operating state signal Sos, the second switching device SW2 is in an off state, and a high level signal is applied to the gate electrode of the first switching device SW1. When a high level signal is applied to the gate electrode of the first switching device SW1, a current flows between the source electrode and the drain electrode of the first switching device SW1, and the charger 200 may determine that micom 122 is in a normal state when the charger 200 senses that a current is flowing through the output terminal 121c.

On the other hand, when a low level signal is applied to the gate electrode of the second switching device SW2 as the operating state signal Sos, the second switching device SW2 is in an on state, and a low level signal is applied to the gate electrode of the first switching device SW1. When resistances of the first resistor R1 and the second resistor R1 are r1 and r2, respectively, a voltage applied to the gate electrode of the first switching device SW1 is $V1*(r2/(r1+r2))$, and thus r1 and r2 are to be such that $V1*(r2/(r1+r2))$ turns off the first switching device SW1. For example, the resistances of the first resistor R1 and the second resistor R2 need satisfy $r1 \gg r2$. When a low level signal is applied to the gate electrode of the first switching device SW1, flow of a current between the source electrode and the drain electrode of the first switching device SW1 is blocked, and the charger 200 may determine that micom 122 is in an abnormal state when the charger 200 senses that a current does not flow through the output terminal 121c.

Figure 6:
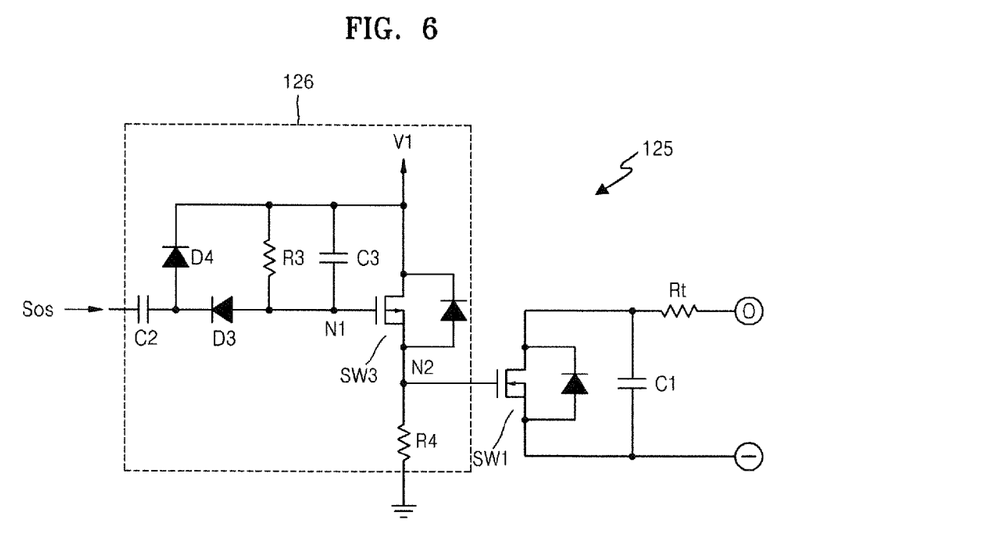
FIG. 6 is a circuit diagram illustrating a malfunction transferring unit according to a fourth embodiment of the present invention.
Figure 7:
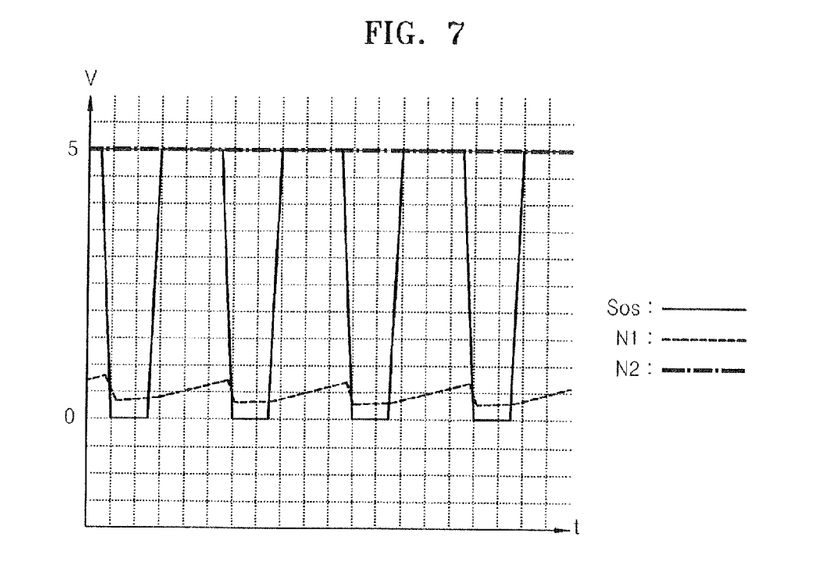
FIG. 7 is a graph showing a voltage measured from the malfunction transferring unit of FIG. 6 when a micom is in a normal state, according to an embodiment of the present invention.
Figure 8:
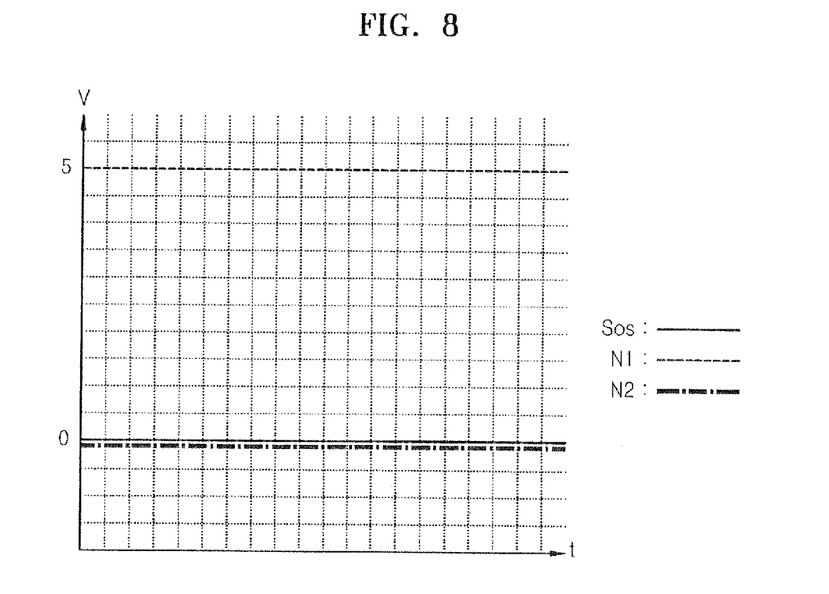
FIG. 8 is a graph showing a voltage measured from the malfunction transferring unit of FIG. 6 when a micom is in an abnormal state, according to an embodiment of the present invention.

Turning now to FIGS. 6 through 8. FIG. 6 is a circuit diagram illustrating the malfunction transferring unit 125 according to a fourth embodiment of the present invention, FIG. 7 is a graph showing a voltage measured from the malfunction transferring unit 125 of FIG. 6 when micom 122 is in a normal state according to the fourth embodiment of the present invention and FIG. 8 is a graph showing a voltage measured from the malfunction transferring unit 125 of FIG. 6 when micom 122 is in an abnormal state according to the fourth embodiment of the present invention.

Referring now to FIG. 6, the malfunction transferring unit 125 may include a sensing resistor Rt, a first capacitor C1, a first switching device SW1, and a switching control unit 126. The sensing resistor Rt, the first capacitor C1, and the first switching device SW1 are the same as those of FIG. 3, respectively, and thus description thereof will not be repeated here.

The switching control unit 126 controls a switching operation of the first switching device SW1. The switching control unit 126 may include a third resistor R3, a fourth resistor R4, a second capacitor C2, a third capacitor C3, a third diode D3, and a fourth diode D4.

A drain electrode of the third switching device SW3 is connected to a power source for supplying a first voltage V1, and a source electrode thereof is connected to a second node N2 to which the gate electrode of the first switching device SW1 is connected. A gate electrode of the third switching device SW3 is connected to a first node N1. The third switching device SW3 may be a p-channel FET.

The third resistor R3 and the third capacitor C3 are connected in parallel between the power source for supplying the first voltage V1 and the first node N1. The fourth resistor R4 is connected between ground and the second node N2. The third diode D3 and the fourth diode D4 are serially connected between the power source for supplying the first voltage V1 and the first node N1, and the second capacitor C2 is connected between a node to which a cathode electrode of the third diode D3 and an anode electrode of the fourth diode D4 are connected and the operating state signal output terminal OS.

According to the fourth embodiment, the micom 122 outputs a pulse signal when the operating state signal Sos indicates that micom 122 is in a normal state. Referring to FIG. 7, a horizontal axis denotes time, and a vertical axis denotes voltage. When a pulse signal is output as the operating state signal Sos, a voltage of the first node N1 varies somewhat but is maintained at a low level that is sufficient to turn on the third switching device SW3. As a low level voltage is applied to the gate electrode of the third switching device SW3, the third switching device SW3 is turned on, and accordingly, a voltage of the second node N2 is maintained at a high level. As the voltage of the second node N2 is maintained at a high level, the first switching device SW1 is turned on, and the charger 200 is able to determine that micom 122 is in a normal state.

On the other hand, when micom 122 is in an abnormal state, a low level signal is output from micom 122 as the operating state signal Sos. Referring to FIG. 8, a horizontal axis denotes time, and a vertical axis denotes voltage. When a low level signal is output as the operating state signal Sos, the voltage of the first node N1 is maintained at a high level. As a high level voltage is applied to the gate electrode of the third switching device SW3, the third switching device SW3 is turned off, and accordingly, the voltage of the second node N2 is maintained at a low level. As the voltage of the second node N2 is maintained at a low level, the first switching device SW1 is turned off, and the charger 200 is able to determine that micom 122 is in an abnormal state.

Meanwhile, the sensing, resistor Rt illustrated in FIGS. 3 through 6 may be a thermistor. The charger 200 may receive information about a temperature of the battery pack 100 from the battery pack 100. In general, a thermistor whose resistance varies according to a temperature is included in the battery pack 100, and the charger 200 is capable of measuring the temperature of the battery pack 100 by measuring the resistance of the thermistor, in detail, by measuring an amount of a current flowing through the thermistor.

According to the current embodiment, the sensing resistor Rt may be used to measure the temperature of the battery pack 100 as described above, and thus the sensing resistor Rt may be used as a thermistor. The thermistor may be a negative temperature coefficient (NTC) material.

As described above, according to the battery pack 100 of the embodiments of the present invention, if micom 122 is out of order, the charger 200 may sense it, and thus the battery pack 100 may be stably charged.

Figure 9:
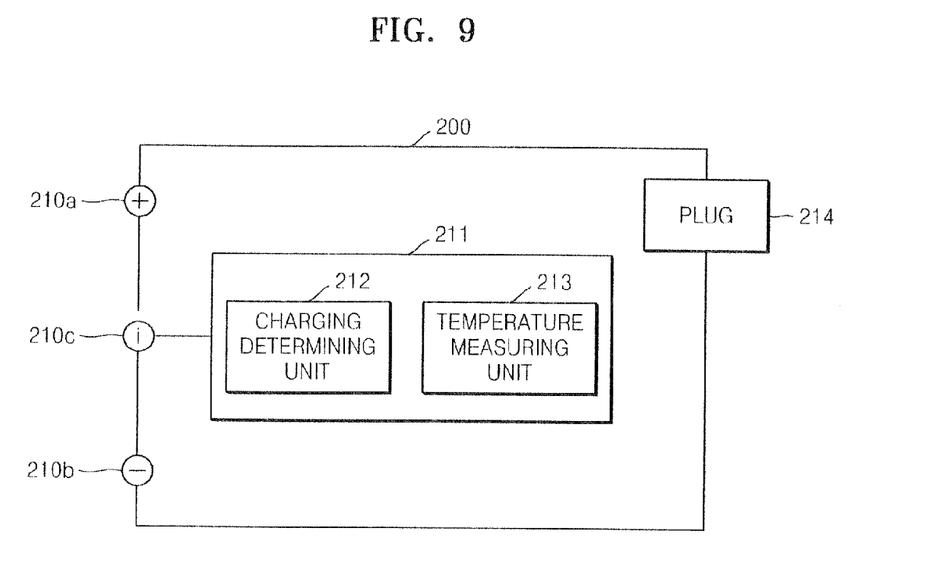
FIG. 9 illustrates a charger according to an embodiment of the present invention.

Turning now to FIG. 9, FIG. 9 illustrates the charger 200 according to an embodiment of the present invention. Referring to FIG. 9, the charger 200 may include a plurality of terminals 210a through 210c, a charging control unit 211, and a plug 214.

The plug 214 receives external power and transfers the same to the battery pack 100, and may be formed as a single unit with a main body or be separated from the main body is wires. The plurality of terminals 210a through 210c are connected to the terminal unit 121 of the battery pack 100. A positive electrode terminal 210a of the charger 200 is connected to the positive electrode terminal 121a of the battery pack 100, and a negative electrode terminal 210b of the charger 200 is connected to the negative electrode terminal 121b of the battery pack 100. The battery 110 is charged or discharged through the positive electrode terminals 121a and 210a and the negative electrode terminals 121b and 210b.

An input terminal 210c of the charger 200 is connected to the output terminal 121c of the battery pack 100. The charger 200 may obtain information on the battery pack 100 by measuring an amount of a current flowing into or out of the input terminal 210c. For example, a temperature of the battery pack 100 may be determined by measuring an amount of a current flowing through the input terminal 210c.

The charging control unit 211 senses a connection to the battery pack 100, and controls charging of the battery pack 100 according to an amount of a current flowing through the input terminal 210c. The charging control unit 211 includes a charging determining unit 212 and a temperature measuring unit 213.

When a current does not flow through the input terminal 210c, the charging determining unit 712 determines that micom 122 is in an abnormal state and stops charging of the battery pack 100. On the other hand, when a current flows through the input terminal 210c, the charging determining unit 212 determines that battery pack 100 is in a normal state and charges the battery pack 100.

When a thermistor for measuring a temperature of the battery pack 100 is included in the battery pack 100, the temperature measuring unit 213 may measure an amount of a current flowing through the input terminal 210c. The temperature measuring unit 213 may determine a temperature of the battery pack 100 according to the measured current.

The charging control unit 211 determines whether to charge the battery pack 100 according to the temperature of the battery pack 100 determined using the temperature measuring unit 213. For example, when the temperature of the battery pack 100 is over a standard value, the battery pack 100 might explode due to being overheated or the protection circuit 120 is likely to be damaged, and thus charging of the battery pack 100 is stopped.

As described above, the charger 200 according to the current embodiment may sense when the micom 122 is out of order, and thus may stably charge the battery pack 100.

Programs for executing the controlling method according to the embodiments of the present invention and modified examples thereof in the battery pack 100 or the charger 200 may be stored in a recording medium. Here, the recording medium is, for example, a processor readable medium such as a semiconductor recording medium (e.g., a flash memory). The medium may be read by and executed in a processor.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
a rechargeable battery; and
a protection circuit to control charging and discharging of the battery, wherein the protection circuit comprises:
a micom to output an operating state signal representing an operating state of the micom; and
a malfunction transferring unit to transfer information on whether the micom is malfunctioning based on the operating state signal.

2. The battery pack of claim 1, wherein the protection circuit comprises an output terminal connected to the charger, and
the malfunction transferring unit to allow a current to flow through the output terminal when the micom is in a normal state, and block a current from flowing to the output terminal when the micom is in an abnormal state.

3. The battery pack of claim 1, wherein the malfunction transferring unit comprises:
a resistor and a capacitor serially connected between a first terminal and a second terminal of the protection circuit;
a switching device connected in parallel to the capacitor; and
a switching control unit to control an operation of the switching device.

4. The battery pack of claim 3, the switching control unit to cause the switching device to pass a current upon receiving a pulsed operating state signal from the micom upon the micom being in a normal state.

5. The battery pack of claim 3, the switching control unit to cause the switching device to pass a current upon receiving a high level operating state signal from the micom upon the micom being in a normal state.

6. The battery pack of claim 5, wherein the resistor is a thermistor, and wherein an amount of current that is passed is a function of a temperature of the battery pack.

7. The battery pack of claim 3, wherein the first terminal is an output terminal to transfer information to the charger, and the second terminal is a negative electrode terminal to charge the battery pack.

8. The battery pack of claim 7, wherein the resistor is a thermistor.

9. The battery pack of claim 8, wherein the thermistor comprises a negative temperature coefficient (NTC) material.

10. The battery pack of claim 1, wherein the micom is distinguished from the malfunction transferring unit.

11. A charging system, comprising:
a battery pack including a rechargeable battery and a protection circuit to control charging and discharging of the battery, the protection circuit including a micom, the protection circuit to generate an operating state signal representing an operating state of the micom; and
a charger to determine whether or not to charge the battery pack based on the operating state signal, the charger to stop charging the battery pack when said micom is in an abnormal state.

12. The charging system of claim 11, wherein when the micom is in a normal state, the protection circuit flows a current through a communication terminal to transfer information between the battery pack and the charger, and when the micom is in the abnormal state, the protection circuit blocks a flow of current through the communication terminal.

13. The charging system of claim 12, wherein when the current flow through the communication terminal is blocked, the charger stops charging the battery pack.

14. The charging system of claim 12, wherein when a current flows through the communication terminal, the charger charges the battery pack based on an amount of said current.

15. The charging system of claim 12, wherein the charger also determines a temperature of the battery pack based on an amount of current that flows through the communication terminal, and the charger stops charging the battery pack when the temperature of the battery pack is over a predetermined value.

* * * * *